J. H. & R. K. BULL.
Spring Scales.
No. 3,752.
2 Sheets—Sheet 1.
Patented Sept. 20, 1844.
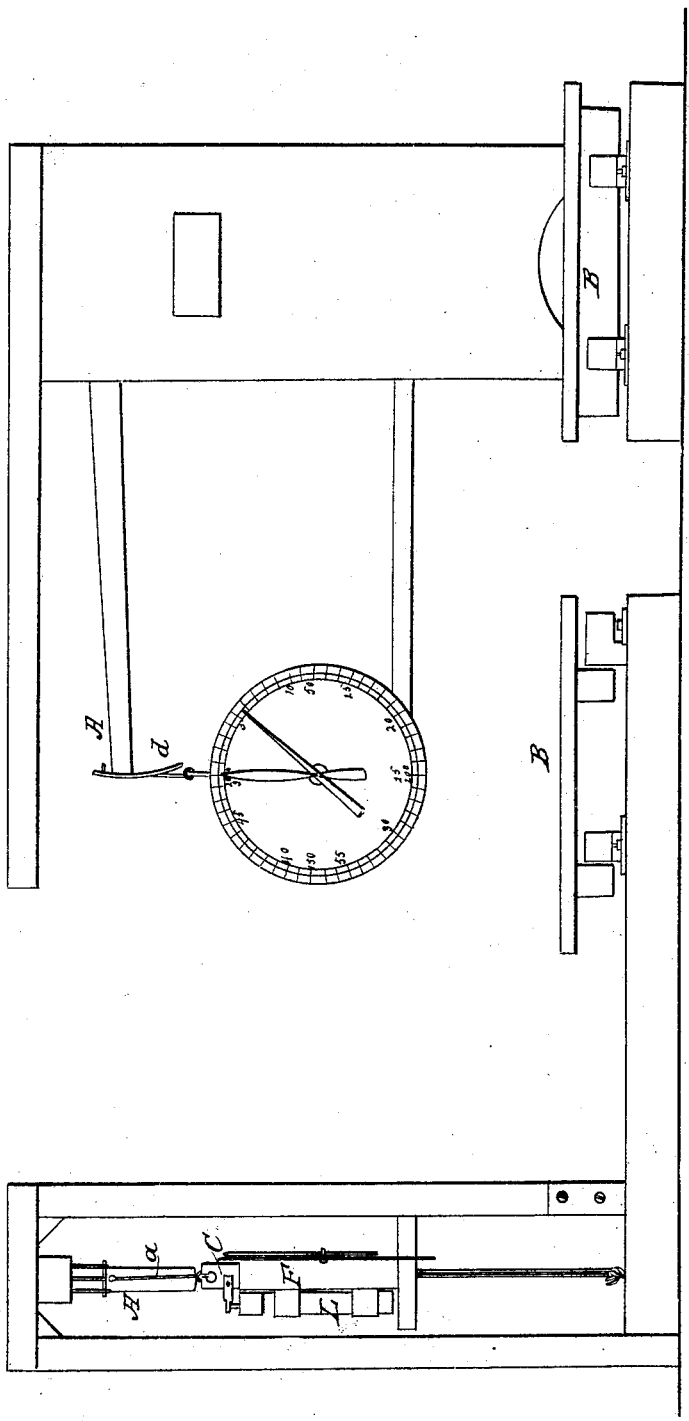

J. H. & R. K. BULL.
Spring Scales.
No. 3,752.
2 Sheets—Sheet 2.
Patented Sept. 20, 1844.
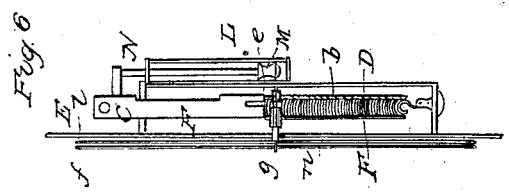
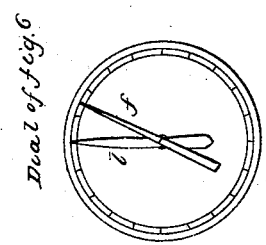
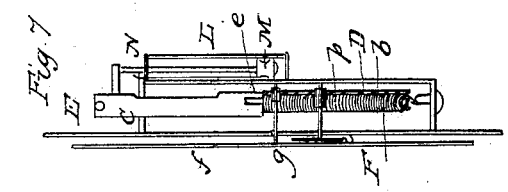
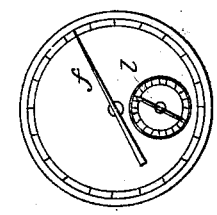
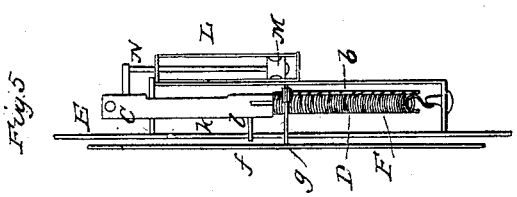
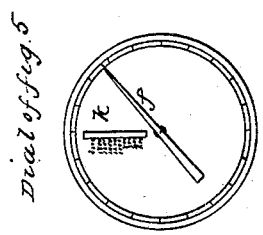
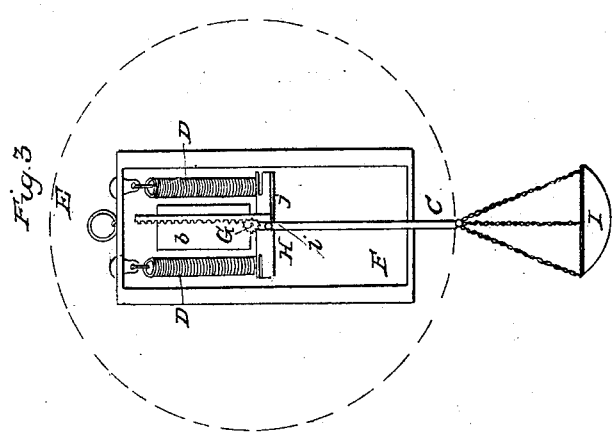
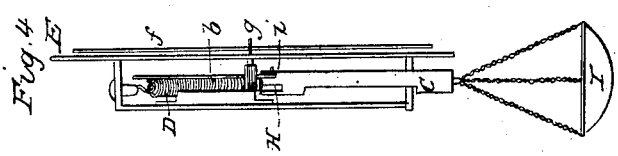

UNITED STATES PATENT OFFICE.

JAMES H. BULL AND R. H. BULL, OF NEW YORK, N. Y.

SPRING-BALANCE.

Specification of Letters Patent No. 3,752, dated September 20, 1844.

*To all whom it may concern:*

Be it known that we, JAMES H. BULL and RICHARD H. BULL, of the city of New York, in the State of New York, have invented certain new and useful Improvements in Balances; and we do hereby declare that the following is a full, clear, and exact description thereof, reference being had to the annexed drawings, making a part of this specification.

Our invention consists firstly in the combining of a spring balance with various kind of lever balances; secondly in certain improvements upon the spring balances now in use.

The object of the invention is to render the weighing of merchandise much more easy, certain, and expeditious than it is by any arrangement or form of balances hitherto known.

The first part of our invention is the application of a spring balance to lever balances of all kinds, in order to obtain the weight of bodies with greater each, certainty and expedition. This is accomplished by simply attaching to the end of the lever, where the counterpoise is usually suspended in lever balances (as at A Figures 1 and 2 of the drawings annexed where the spring balance is shown combined with Bull's double lever balance patented March 3rd, 1837) the end of the bar C of a spring balance to which the springs are attached, having the strength of the springs proportioned to the power wanted for the counterpoise at the end of the lever A. The use of the arc of a circle $a$, as represented in the drawings, placed at the end of the lever A to raise the bar C of the spring balance perpendicularly, is not needed when the lever is long, and the arc of motion small.

The operation of the machine is as follows: The placing of merchandise on the platform B Figs. 1 and 2 tends to lift the end A of the lever to which the spring balance is attached, and the springs D (see Figs. 3 and 4) of the latter being acted upon through the bar C, which is connected with lever A, are distended in regular proportion, and by means of the rack $d$, and pinion $e$, connected with the hand $f$ by the arbor $g$, the exertion or force applied on the springs, D, is indicated on the dial E, which is graduated in accordance to the uses to which the scale is to be put.

The second part of our invention will be better understood by first describing the construction of the spring balance (sometimes called Salter's balance) as it is now used. This balance consists of an iron case or box F (see Figs. 3 and 4 which are views of Salter's balance) containing one or more spiral springs D. Connected with the springs is a cross bar H, and attached to this is a second bar C, which extends through an opening in one end of the box F, and sustains the dish or scale I, for holding the substance to be weighed. In the bar C, at the inner end, is a slit to receive the end of the rack $d$, and a pin $i$ passes through the bar and rack to fasten them together. The hole in the rack is made larger than the pin, so as to allow the rack to turn easily upon the pin. Attached to the cross bar H, is a small bar spring $j$, which operates on the corner of the rack $b$ so as to press it against a pinion $e$ into which it gears, and which is placed on an arbor $g$ extending horizontally across the box F, and through a dial plate E, placed against the side of the box. The dial is divided into some convenient number of parts, and numbered in accordance with the elastic power of the springs. The arbor $g$ is armed with a hand $f$, and the pinion $e$ being actuated by the rack $b$, as it moves up and down upon the distension or contraction of the springs D, causes the hand to move around the dial, and indicate the weight upon the scale.

Our improvements consist, firstly, in adding another hand in order to indicate hundreds or larger divisions. This is accomplished in one way, by having a slot $k$, see Fig. 5, in the dial at that part, which is directly in front of the bar C, upon one side of which slot the numbers to be indicated are marked, and further by fixing to the bar C a hand $l$, which passing through the slot, is bent at a right angle, and as the bar C moves up and down, passes over the numbers. Another modification of this improvement (see Fig. 6) is, to place a hand $l$ on a hollow shaft $m$, surrounding the arbor $g$, and cause it to move around the dial by means of a second rack $n$, and pinion $o$, inside of the box F arranged, and fastened like the first rack and pinion, the second pinion being of the proper size to give the requisite slowness of motion to the second hand. A third modification (see Fig. 7) is to place a second and larger pinion $p$ in the box F, not concentric with the pinion $e$, but above or below it, as the case may be, and arranged, and secured like the pinion *e*, which second pinion shall be actuated in like manner with the pinion *e* by the rack *b;* and upon the arbor of this second pinion to place the additional hand *l* which by traversing a smaller graduated circle shall indicate the larger weights. Secondly, in certain appliances for preventing the trembling motion of the hands. Inasmuch as it will be necessary for greater accuracy of the machine to reduce the friction in the works of the spring balance to a low point the hands will have a tremulous motion, when a weight is suddenly put on the scale, and it will be some seconds before they come to a state of rest. The means which we use to prevent this trembling, consists in attaching to the back of the box F a cylinder L, see Figs. 5, 6 and 7, containing some liquid as oil, alcohol or water, which shall have immersed in it a dasher or plunger M small enough to move freely within the cylinder. The dasher rod N is connected with the bar C so that, as the bar moves in and out of the box F by the action of the springs in the operation of weighing the dasher comes up and down in the fluid the resistance offered by which produces the desired effect.

Figs. 1 and 2 of the drawings annexed represent a combination of a spring balance containing our improvements with one of Bull's double lever balances. Figs. 3 and 4 are views of a spring balance (Salter's balance) as it is now used. Figs. 5, 6 and 7 are views of a spring balance containing our improvements.

What we claim as our invention and desire to secure by Letters Patent is—

1. The combining of a spring balance with the various kinds of lever balances to which it may be adapted for the purpose of rendering the weighing of merchandise, more easy, certain and expeditious, and this we claim whether the spring balance be used with or without our improvements upon it herein described.

2. We claim in combination with the spring balance herein described the addition of a second hand.

3. We claim the combination of the spring balance herein described consisting of the modes of preventing the trembling motion of the hands viz the liquor cylinder L and dasher M.

JAMES H. BULL.
RICH'D H. BULL.

Witnesses:
LEBBEUS CHAPMAN, Jr.,
ARCH'D HILTON.